United States Patent
De Buyl et al.

[11] Patent Number: 6,037,434
[45] Date of Patent: Mar. 14, 2000

[54] METHOD FOR PREPARING POLYDIORGANOSILOXANES PARTIALLY END-BLOCKED WITH SUBSTITUTED SILETHYLENE GROUPS

[75] Inventors: Francois De Buyl, Brussels; Eric Damme, Marche-Lez-Ecaussinnes; Patrick Leempoel, Brussels, all of Belgium

[73] Assignee: Dow Corning S. A., Seneffe, Belgium

[21] Appl. No.: 09/172,429

[22] Filed: Oct. 14, 1998

[30] Foreign Application Priority Data

Oct. 15, 1997 [GB] United Kingdom ............... 9721831

[51] Int. Cl.⁷ .................................................. C08G 77/06
[52] U.S. Cl. ................... 528/34; 528/35; 528/23; 528/15; 528/31; 528/32
[58] Field of Search .............. 528/34, 35, 23, 528/15, 31, 32

[56] References Cited

U.S. PATENT DOCUMENTS

| | | | |
|---|---|---|---|
| 3,175,993 | 3/1965 | Weyenberg | 260/46.5 |
| 3,274,145 | 9/1966 | Dupree | 260/37 |
| 4,772,675 | 9/1988 | Klosowski et al. | 528/15 |
| 4,888,380 | 12/1989 | Kamis et al. | 524/588 |
| 4,898,910 | 2/1990 | Kamis et al. | 524/860 |
| 4,962,174 | 10/1990 | Bilgrien et al. | 528/15 |
| 5,264,603 | 11/1993 | Altes et al. | 556/411 |
| 5,840,794 | 11/1998 | Palmer | 524/425 |

*Primary Examiner*—Margaret G. Moore
*Attorney, Agent, or Firm*—Patricia M. Scaduto

[57] ABSTRACT

This specification describes and claims a method for producing polydiorganosiloxanes partially end-blocked with substituted silethylene groups. The method comprises the steps of: A) mixing a hydroxyl end-blocked polydiorganosiloxane with a silicon-containing compound having at least two silicon-bonded hydrogen atoms and a —Si(R')$_3$ end-blocked siloxane in the presence of an acidic polymerisation catalyst to form a mixture wherein each R' independently denotes a monovalent hydrocarbon or halohydrocarbon having 1 to 6 carbon atoms, B) conducting a reaction with the mixture of step A so as to produce a polydiorganosiloxane having at least one silicon-bonded hydrogen atom and at least one —Si(R')$_3$ group and C) adding a substituted alkenylsilane in the presence of a hydrosilylation catalyst to the reaction product obtained from step B to form a polydiorganosiloxane partially end-blocked with substituted silethylene groups. A chain extender may also be included with the reaction mixture of step A and/or the reaction product of step B. The polydiorganosiloxanes are suitable for use in sealant compositions.

14 Claims, No Drawings

METHOD FOR PREPARING POLYDIORGANOSILOXANES PARTIALLY END-BLOCKED WITH SUBSTITUTED SILETHYLENE GROUPS

This invention relates to a method for preparing polydiorganosiloxanes partially end-blocked with substituted silethylene groups and in particular to a method for preparing partially alkoxysilethylene end-blocked polydiorganosiloxanes. These polydiorganosiloxanes are useful in sealant compositions.

Polydiorganosiloxanes end-blocked with alkoxysilethylene groups at both ends of the polymer are well known in the art. For example, as described in U.S. Pat. Nos. 3,175,993, 4,772,675 and 4,962,174.

U.S. Pat. No. 3,175,993 describes alkoxysilethylene end-blocked polydiorganosiloxanes and a method for their preparation which comprises reacting a hydrogen end-blocked polydiorganosiloxane with an alkoxysilane having an alkenyl group in the presence of a platinum catalyst. The alkoxysilethylene end-blocked polydiorganosiloxane has the average molecular formula:

in which Z' is a divalent hydrocarbon radical free of aliphatic unsaturation of from 2 to 18 inclusive carbon atoms, $R^{iv}$ is an alkyl radical or haloalkyl radical having no halogen alpha to the oxygen both of less than 5 carbon atoms, $R^1$ is free of aliphatic unsaturation and is a monovalent hydrocarbon radical, halohydrocarbon radical or cyanoalkyl radical having 1 to 18 inclusive carbon atoms, y has an average value from 0 to 2, x has a value of at least 3 and a has an average value from 2 to 3.

U.S. Pat. No. 4,772,675 describes a method for preparing an alkoxysilethylene end-blocked polymer which comprises reacting a dimethylhydrogenosiloxy end-blocked polydimethylsiloxane with vinyltrimethoxysilane. A method is also disclosed in which a vinyl end-blocked polydiorganosiloxane is reacted with an end-blocking composition of the formula:

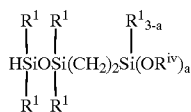

wherein a, $R^1$ and $R^{iv}$ are as defined above.

U.S. Pat. No. 4,962,174 describes a method for preparing alkoxysilethylene end-blocked polydiorganosiloxane which comprises first reacting a hydroxyl end-blocked polydiorganosiloxane with an excess of a compound having from two to four SiH groups in the presence of a platinum catalyst, then reacting that product with vinyltrialkoxysilane.

The polydiorganosiloxanes obtained by the methods as described above have a substituted silethylene group at each end of the polydiorganosiloxane chain and therefore are referred to as polydiorganosiloxanes fully end-blocked with substituted silethylene groups.

One important application of alkoxysilethylene end-blocked polydiorganosiloxanes is in sealant compositions. However, when fully alkoxysilethylene end-blocked polydiorganosiloxanes are used in this application, the desired physical properties such as low hardness and high elongation at break cannot be achieved with known formulations. In order to achieve such physical properties, one can, for example, decrease the number of groups susceptible to cross-linking in the sealant compositions by replacing fully alkoxysilethylene end-blocked polydiorganosiloxanes with partially alkoxysilethylene end-blocked polydiorganosiloxanes.

To obtain a partially alkoxysilethylene end-blocked polydiorganosiloxane, it is common practice to retain a proportion of unreacted SiH or Si-vinyl groups as end-groups on the final polymer. However, polydiorganosiloxanes end-blocked with alkoxysilethylene and SiH groups are not sufficiently stable when used in sealant compositions as evidenced, for example, by bubbling of the sealant during cure or by yellowing of the sealant composition. Also, partially alkoxysilethylene end-blocked polydiorganosiloxanes containing residual vinyl end-groups are not stable in U.V. light or high temperature conditions.

We have now found a method for preparing polydiorganosiloxanes partially end-blocked with substituted silethylene groups and in particular alkoxysilethylene groups which obviates the problems discussed above.

The present invention provides in one of its aspects a method for producing a polydiorganosiloxane partially end-blocked with substituted silethylene groups comprising the steps of:

A) mixing a hydroxyl end-blocked polydiorganosiloxane with a silicon-containing compound having at least two silicon-bonded hydrogen atoms and a —Si(R')$_3$ end-blocked siloxane in the presence of an acidic polymerisation catalyst to form a mixture wherein each R' independently denotes a monovalent hydrocarbon or halohydrocarbon having 1 to 6 carbon atoms, B) forming a reaction product by conducting a reaction with the mixture of step A so as to produce a polydiorganosiloxane having at least one silicon-bonded hydrogen atom and at least one —Si(R')$_3$ group and C) adding a substituted alkenylsilane in the presence of a hydrosilylation catalyst to the reaction product obtained from step B to form a polydiorganosiloxane partially end-blocked with substituted silethylene groups.

The word "comprising" where used herein is used in its widest sense to mean and to encompass the notions of "include", "comprehend" and "consist of".

In the first step A of a method according to the invention, a hydroxyl end-blocked polydiorganosiloxane is mixed with a blend of a silicon-containing compound having at least two silicon-bonded hydrogen atoms and a —Si(R')$_3$ end-blocked siloxane in the presence of an acidic polymerisation catalyst to form a mixture wherein each R' independently denotes a monovalent hydrocarbon or halohydrocarbon having 1 to 6 carbon atoms. Preferably the silicon-containing compound having at least two siliconbonded hydrogen atoms and the —Si(R')$_3$ end-blocked siloxane are mixed together prior to the addition of the hydroxyl end-blocked polydiorganosiloxane.

A hydroxyl end-blocked polydiorganosiloxane suitable for use in step A of a method according to the invention preferably has the general formula (I):

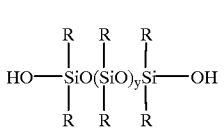

wherein each R may be the same or different and is selected from the group consisting of monovalent hydrocarbon, monovalent halohydrocarbon and monovalent cyanoalkyl radicals having from 1 to 18 carbon atoms. Preferably R is a methyl or phenyl group and most preferably a methyl group. y has a value such that the polymer has a viscosity of from 5 to 3,000,000 mPa.s preferably 10 to 10,000 mPa.s and more preferably 20 to 2000 mPa.s at 25° C. Hydroxyl end-blocked polydiorganosiloxanes are well known in the art and are commercially available. They can be made by a number of techniques known in the art, for example, by hydrolysing a diorganodichlorosilane, separating the resulting tetrasiloxane cyclic material from the hydrolysis mixture, and subsequently polymerizing the cyclic material, in the presence of an alkaline catalyst, to the polydiorganosiloxane. Examples of suitable hydroxyl end-blocked polydiorganosiloxanes include α,ω-hydroxypoly-dimethylsiloxane, α,ω-hydroxy-polymethylphenylsiloxane and α,ω-hydroxy-polydimethylcomethylphenylsiloxane. A mixture of two or more types of hydroxyl end-blocked polydiorganosiloxane may be used in a process according to the invention however it is preferred that only one type is utilised.

A suitable silicon-containing compound having at least 2 silicon-bonded hydrogen atoms for use in step A of a method according to the invention has the general formula (II):

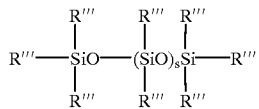

(II)

wherein each R''' may be the same or different and is selected from the group consisting of hydrogen, an aliphatic hydrocarbon having from 1 to 18 carbon atoms and an aromatic hydrocarbon. Preferably R''' is a hydrogen atom or methyl group and more preferably a methyl group and s has a value of from 0 to about 100 with the proviso that there is at least 2 silicon-bonded hydrogen atoms per molecule. Examples of suitable silicon-containing compounds having at least two silicon-bonded hydrogen atoms include tetramethyldisiloxane, α,ω-hydrido-polydimethyl-comethylphenylsiloxane. Preferably the silicon-containing compound has only two silicon-bonded hydrogen atoms per molecule with the hydrogen atoms provided on different silicon atoms.

Preferred silicon-containing compounds having two silicon-bonded hydrogen atoms have the general formula (III)

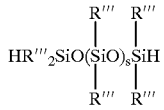

(III)

wherein s has a value of from 4 to 20 and R''' represents a methyl group.

Silicon-containing compounds having at least two silicon-bonded hydrogen atoms are commercially available and are well known in the art, for example, as described in GB 1,141,868.

A —Si(R')$_3$ end-blocked siloxane suitable for use in step A of a method according to the invention may have the general formula (IV):

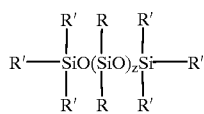

(IV)

wherein each R may be the same or different and is as defined above and each R' independently denotes a monovalent hydrocarbon having 1 to 6 carbon atoms or a halohydrocarbon having 1 to 6 carbon atoms, for example, a haloalkyl group Preferably R' is a monovalent hydrocarbon having 1 to 6 carbon atoms, more preferably a methyl or phenyl group and most preferably a methyl group. z has a value of from 0 to 100 preferably from 4 to 20 and more preferably 4 to 10.

Methods of making —Si(R')$_3$ end-blocked siloxanes are well known in the art and these siloxanes are commercially available. Particularly suitable —Si(R')$_3$ end-blocked siloxanes for use in a method according to the invention include hexamethyldisiloxane, α,ω-trimethylsilyl-polydimethylsiloxane and α,ω-trimethylpolymethylphenylsiloxane.

In a method according to the invention an acidic polymerisation catalyst must be provided in step A. Examples of suitable catalysts include sulphuric acid, hydrochloric acid, Lewis acids and dodecenylbenzene sulphonic acid. The acidic polymerisation catalyst is preferably an acidic phosphazene catalyst such as the type derived from phosphonitrile halide in particular phosphonitrile chloride, for example, as prepared according to U.S. Pat. No. 3,839,388, U.S. Pat. No. 4,564,693 (for example as prepared by reacting phosphorus pentachloride and ammonium chloride) and EP 215 470 and phosphonitrile halide catalysts as described in GB 2 252 969 and EP 657 209 having the general formula $[X(PX_2=N)_nPX_3]^+[MX_{(V-t+1)}R^{vi}_t]^-$ wherein X denotes a halogen atom and is preferably a chlorine atom, M is an element, $R^{iv}$ is an alkyl group having up to 12 carbon atoms, n has a value of from 1 to 6 and preferably has a value of from 2 to 4 and more preferably 2, v is the valence or oxidation state of M and t has a value of from 0 to v–1. Examples of M include P, Al or Sb. The anionic part of the catalyst is preferably derived from a Lewis acid and has the formula $[MX_{(V-t+1)}R^{vi}_t]^-$. Although it is preferred that the value of t is zero, alkyl groups may be included. Preferably the Lewis acid based anion contains a halide X which is the same as the halide of the phosphonitrile cationic part, i.e. most preferably a chlorine. The element M of the Lewis acid part is an electropositive element having an electronegativity value according to Pauling's scale of from 1 to 2, preferably from 1.2 to 1.9, most preferably 1.5 to 1.9. Suitable elements are found in groups Ib, IIa, IIb, IIIa, IVa, IVb, Va, Vb, VIb, VIIb, and VIII of the periodic table. They include P, Al, B, Be, Me, Sb and Si and preferably P. It is preferred that the difference in electronegative value between the phosphorus atom of the phosphonitrile part of the catalyst and the M element is as large as possible within the preferred range, giving improved catalytic activity when this value is larger. Preferably the phosphazene catalyst is a material according to the formula $Cl_3P(NPCl_2)_nNPCl_3^+PCl_6^-$ where n is 1 or 2.

In step B of a method according to the invention, a reaction is conducted with the reaction mixture of step A to produce a polydiorganosiloxane having at least one silicon-bonded hydrogen atom and at least one —Si(R')$_3$ group. The proportion of silicon-bonded hydrogen atoms to —Si(R')$_3$ groups will depend upon such factors as, for example, the ratio of silicon-bonded hydrogen atoms versus —Si(R')$_3$ groups present in the reaction mixture of step A. It is preferred to use —Si(R')₃ end-blocked siloxanes and silicon-containing compounds having two silicon-bonded hydrogen atoms which have substantially the same viscosity and preferably the viscosity is in the range of from 10 to 20 mPa.s.

In a method according to the invention, a chain extender may be added to the reaction mixture of step A and/or reaction product obtained from step B prior to step C. The chain extender is selected to react with hydroxyl groups remaining in the reaction mixture/product and so to chain-extend the reaction product obtained in step B. It may alternatively or additionally be selected to neutralise the reaction of step B by reacting with the acidic polymerisation catalyst.

Preferably the chain extender is a cyclosilazane compound for example hexamethylcyclotrisilazane, octamethylcyclotetrasilazane or decamethylcyclopentasilazane. More preferably the chain extender is hexamethylcyclotrisilazane. Cyclosilazanes are well known in the art and can be prepared for example by condensation of monomeric aminosilane.

We have discovered that by adding a chain extender such as for example hexamethylcyclotrisilazane, we eliminate the remaining hydroxyl groups from the reaction product obtained in step B by a silylation reaction but we also chain extend the reaction product obtained in step B.

In step C of a method according to the invention, a substituted alkenylsilane is added in the presence of a hydrosilylation catalyst to the reaction product obtained from step B to form a polydiorganosiloxane partially end-blocked with substituted silethylene groups. Examples of suitable substituted alkenylsilanes include alkenylalkoxysilanes, alkenylacetoxysilanes and alkenyloximosilanes. Preferably the substituted alkenylsilane is an alkenylalkoxysilane or an alkenylacetoxysilane. More preferably the substituted alkenylsilane is an alkenylalkoxysilane and may be of the general formula (V):

$$R^vR_mSi(OR")_{3-m} \quad (V)$$

wherein each R" is the same or different and is a monovalent hydrocarbon having from 1 to 6 carbon atoms and R is as defined above, $\underline{m}$ has the value of 0 or 1 and is preferably 0 and $R^v$ represents a monovalent unsaturated hydrocarbon. Preferably R" is an alkyl group and more preferably methyl or ethyl, and preferably R and $R^v$ represent a vinyl, allyl, hexenyl or styryl group or a combination thereof and more preferably vinyl. Examples of suitable alkenylalkoxysilanes include vinyltrimethoxysilane, vinyltriethoxysilane, allyltrimethoxysilane, hexenyltriethoxysilane, methylvinyldimethoxysilane or mixtures thereof. Preferably the alkenylalkoxysilane is vinyltriethoxysilane.

In step C of a method according to the invention, the reaction of the substituted alkenylsilane with the reaction product obtained from step B is catalysed with a hydrosilylation catalyst. Examples of suitable hydrosilylation catalysts include catalysts based on platinum, rhodium or iridium. Preferably the hydrosilylation catalyst is based on platinum and suitable platinum catalysts include platinum chloride, salts of platinum, chloroplatinic acids and platinum complexes. A preferred form is chloroplatinic acid in either hexahydrate or anhydrous form. Alternatively platinum complexes may also be used e.g. as prepared from chloroplatinic acid hexahydrate and divinyltetramethyldisiloxane. Platinum complexes of chloroplatinic acid hexahydrate and divinyltetramethyldisiloxane diluted with dimethylvinylsiloxy end-blocked polydimethylsiloxane to provide 0.7 weight percent platinum are most preferred.

By use of a method according to this invention one may produce a polydiorganosiloxane partially end-blocked with substituted silethylene groups preferably having the general formula (VI):

wherein each R be the same or different and is selected from the group consisting of monovalent hydrocarbon, monovalent halohydrocarbon and monovalent cyanoalkyl radicals having 1 to 18 carbon atoms, each R' may be the same or different and is as defined above. D has the formula:

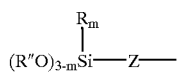

wherein R" is as defined above, Z is a divalent hydrocarbon radical having 1 to 6 carbon atoms or a combination of divalent hydrocarbon radical and siloxane radicals such as $(R_2SiO)_n$ with $\underline{n}$ having a value from 0 to 10, $\underline{m}$ is 0 or 1 and $\underline{x}$ has a value such that the polydiorganosiloxane has a viscosity of from 500 to 3,000,000 mpa.s and preferably 1,000 to 350,000 mPa.s and more preferably 10,000 to 120,000 mPa.s at 25° C.

An example of a method for preparing polydiorganosiloxane partially end-blocked with substituted silethylene groups according to the invention comprises the following steps: A first step A of mixing the hydroxyl endblocked polydiorganosiloxane at a reaction temperature of, for example, 50 to 220° C., preferably 150 to 200° C., with a blend of a silicon-containing compound having at least two silicon-bonded hydrogen atoms and a —Si(R')₃ end-blocked siloxane in the presence of an acidic polymerisation catalyst to form a mixture. In the second step B the reactants react and condense with the hydroxyl groups of the polydiorganosiloxane to produce a polydiorganosiloxane end-blocked with at least one silicon-bonded hydrogen atom and at least one —Si(R')₃ group. The weight ratio between the silicon-containing compound having at least two silicon-bonded hydrogen atoms and the —Si(R')₃ end-blocked siloxane is preferably from 1/100 to 100/1, more preferably from 1/10 to 10/1 and most preferably from 7/3 to 9/1. The weight ratio of the hydroxyl end-blocked polydiorganosiloxane to the blend is from 100/1 to 1/100 and preferably from 95/5 to 99/1. The catalyst is added at a concentration of, for example, 5 to 100 ppm of the hydroxyl end-blocked polydiorganosiloxane and preferably 15 to 50 ppm.

It is preferred that the silicon-containing compound having at least two silicon-bonded hydrogen atoms and the —Si(R')₃ end-blocked siloxane have substantially the same viscosities in order to ease the blending process.

Additionally by controlling the ratio of silicon-bonded hydrogen atoms to —Si(R')₃ groups present in the blend it is possible to control the ratio of silicon-bonded hydrogen atoms to —Si(R')₃ groups present in the reaction product of step B which gives one of the advantages of the process according to the invention.

A chain extender can be added to the reaction mixture of step A and/or reaction product of step B at a concentration of, for example, from 500 to 2000 ppm of the hydroxyl end-blocked polydiorganosiloxane. The chain extender reacts with the hydroxyl groups remaining on the reaction product of step B. Preferably the chain extender is a cyclosilazane such as hexamethylcyclotrisilazane and the reaction of the cyclosilazane with the reaction product produces $NH_3$ as a by-product which can neutralize the acidic polymerisation catalyst.

In step C according to the invention, a substituted alkenylsilane preferably an alkenylalkoxysilane is preferably added in a molar excess of the reaction product of step B, in the presence of a hydrosilylation catalyst preferably platinum catalyst at a temperature of, for example, from 20 to 150° C., preferably 30 to 70° C. to obtain a polydiorganosiloxane partially end-blocked with substituted silethylene groups for example partially alkoxysilethylene end-blocked polydiorganosiloxane. It is most preferred that the reaction is carried out at a temperature of approximately 50° C. and preferably does not exceed 70° C. The substituted alkenylsilane undergoes a hydrosilylation reaction with the residual SiH present in the reaction product of step B to form a polydiorganosiloxane partially end-blocked with substituted silethylene groups.

In addition to the polydiorganosiloxanes partially end-blocked with substituted silethylene groups made by a process according to the invention, other materials can also be included in the reaction product of step C. For example polydiorganosiloxane fully end-blocked with substituted silethylene groups, fully $(R')_3Si$-endblocked polydiorganosiloxane and partially and/or fully hydroxyl end-blocked polydiorganosiloxane. The percentage of other materials present will depend upon, for example, the ratio of silicon-bonded hydrogen atoms to $-Si(R')_3$ present during the process.

The reaction product of step C of a method according to the invention preferably has from 50 to 99% and more preferably 60 to 99% of the total end-groups present as substituted silethylene end-groups and a viscosity varying from 10 to 3,000,000 mPa.s preferably from 1,000 to 350,000 mPa.s and more preferably 10,000 to 120,000 mPa.s.

Polydiorganosiloxanes partially end-blocked with substituted silethylene groups obtained from a method according to the invention are suitable for use in sealant compositions and may contribute to desired physical requirements such as low modulus, low hardness and high elongation at break.

The following examples are included for illustrative purposes only and should not be construed as limiting the invention which is set forth in the appended claims. All parts are expressed by weight and viscosities are measured at 25° C.

The percentage of substituted silethylene end-groups present in the polydiorganosiloxanes obtained in the following examples was identified by comparing the proportion of H bonded to silicon, as found by H-MNR analysis, of the reaction product of step A and of the final product of step C.

EXAMPLE 1
Preparation of Partially Alkoxysilethylene End-blocked Polydiorganosiloxane Partially alkoxysilethylene end-blocked polydiorganosiloxanes with 78% of the total end-groups present as alkoxysilethylene end-groups and a viscosity M mPa.s (as detailed in Table I) were prepared using the following method:

A polymerisation reactor equipped with heating, cooling and spray drying facilities was used. The reactor comprised a Niro® spray drier having a reagent inlet means, a reactor chamber and an outlet means. The reagent inlet means also comprised a mixing device for admixing a catalyst at required proportions and a compressed air inlet. The feeding rate of the reactants into the polymerisation reactor was 300kg/hour, and the air flow was 250Nm$^3$/hour at a temperature of 200° C.

Step A 100 parts of a hydroxyl end-blocked polydimethylsiloxane having a viscosity of 70 mPa.s was heated to a temperature of 185° C. and then mixed with y parts (details found in Table I) of a blend of polymers A and B. A was a hydrogen end-blocked polydimethylsiloxane having 0.16 weight % SiH bonds and a viscosity of 10 mPa.s and B was a $Si(CH_3)_3$ end-blocked polydimethylsiloxane with a viscosity of 10 mPa.s at 25° C.

An acidic phosphazene catalyst based on phosphonitrile chloride, at a concentration of 20 ppm based on the hydroxyl end-blocked polydimethylsiloxane was then added to the mixture which was then introduced into the polymerization reactor.

Step B

To the mixture of Step A, hexamethylcyclotrisilazane was added in a proportion of 1000 ppm based on the level of hydroxyl end-blocked polydimethylsiloxane in order to react with any residual hydroxyl groups present in the reaction mixture and to neutralize the phosphazene catalyst.

Step C z parts of vinyltriethoxysilane was then added to 100 parts of the reaction product of step B in the presence of w parts of a platinum complex with divinyltetramethyldisiloxane.

Partially alkoxysilethylene end-blocked polydiorganosiloxanes with 78% of the total end-groups present in the reaction mixture being alkoxysilethylene end-groups were obtained at different viscosities M, as reported in Table I.

TABLE I

| M mPa.s | A/B | y | z | w |
|---|---|---|---|---|
| 20,000 | 2.4/0.6 | 3.0 | 1.08 | 0.12 |
| 60,000 | 1.6/0.4 | 2.1 | 0.76 | 0.08 |
| 110,000 | 1.3/0.3 | 1.7 | 0.63 | 0.07 |

EXAMPLE 2
Preparation of Partially Alkoxysilethylene End-blocked Polydiorganosiloxanes with various % Alkoxysilethylene End-groups Mixtures of partially alkoxysilethylene end-blocked polydiorganosiloxanes of viscosity 110,000 mpa.s with varying percentage of alkoxysilethylene end-groups have been prepared following the procedure of Example 1 where y represents 1.7 parts, z represents 0.63 parts and w represents 0.007 parts and using the ratio A/B as indicated in Table II. The theoretical percentage of alkoxysilethylene groups was obtained form the ratio of A/B as indicated in Table II. A good correlation was obtained between the theoretical results and the results obtained by H-NMR analysis as reported in Table II.

TABLE II

| Theoretical % alkoxysilethylene groups | A/B | Actual % alkoxysilethylene groups |
|---|---|---|
| 70 | 1.21/0.45 | 67 |
| 75 | 1.28/0.37 | 75 |
| 80 | 1.40/0.30 | 79 |
| 85 | 1.51/0.24 | 83 |

That which is claimed is:

1. A method for producing a polydiorganosiloxane partially end-blocked with substituted silethylene groups comprising the steps of:
   A) mixing a hydroxyl end-blocked polydiorganosiloxane with a silicon-containing compound having at least two silicon-bonded hydrogen atoms and a —Si(R')$_3$ end-blocked siloxane in the presence of an acidic polymerization catalyst to form a mixture;
   B) conducting a reaction with the mixture of step A so to produce a reaction product comprising polydiorganosiloxane having at least one silicon-bonded hydrogen atom and at least one —Si(R')$_3$ group; and
   C) adding a substituted alkenylsilane in the presence of a hydrosilylation catalyst to the reaction product obtained from step B to form a polydiorganosiloxane partially end-blocked with substituted silethylene groups;
      wherein each R' is independently selected from the group consisting of a monovalent hydrocarbon having 1 to 6 carbon atoms and a monovalent halohydrocarbon having 1 to 6 carbon atoms.

2. A method according to claim 1 wherein the substituted alkenylsilane is an alkenylalkoxysilane and the polydiorganosiloxane partially end-blocked with substituted silethylene groups is a partially alkoxysilethylene end-blocked polydiorganosiloxane.

3. A method according to claim 1 wherein the silicon-containing compound having at least two silicon-bonded hydrogen atoms and the —Si(R')$_3$ end-blocked siloxane are mixed together prior to mixing with the hydroxyl end-blocked polydiorganosiloxane.

4. A method according to claim 1 wherein the silicon-containing compound having at least two silicon-bonded hydrogen atoms has substantially the same viscosity as the —Si(R')$_3$ end-blocked siloxane.

5. A method according to claim 1 wherein the acidic polymerization catalyst is a phosphonitrile halide catalyst having the general formula $\{X(PX_2=N)_nPX_3\}+\{MX_{\{v-t+t\}}R^{vi}_t\}^-$ wherein X denotes a halogen atom,
   M is an element,
   $R^{vi}$ is an alkyl group having up to 12 carbon atoms,
   n has a value of from 1 to 6,
   v is selected from the group consisting of the valence of M and the oxidation state of M and
   t has a value of from 0 to v−1.

6. A method according to claim 1 wherein the substituted alkenylsilane is vinyltriethoxysilane.

7. A method according to claim 1 wherein the weight ratio between the silicon-containing compound having at least two silicon-bonded hydrogen atoms and the —Si(R')$_3$ end-blocked siloxane is from 7/3 to 9/1.

8. A method according to claim 1 wherein the weight ratio between the hydroxyl end-blocked polydiorganosiloxane and the total weight of a blend of the silicon-containing compound having at least two silicon-bonded hydrogen atoms and the —Si(R')$_3$ end-blocked siloxane is from 95/5 to 99/1.

9. A method according to claim 1 wherein a chain extender is added to the mixture of step A.

10. A method according to claim 9 wherein the chain extender is a cyclosilazane.

11. A method according to claim 9 wherein the chain extender is hexamethylcyclotrisilazane.

12. A method according to claim 1 wherein a chain extender is added to the reaction product of step B prior to step C.

13. A method according to claim 12 wherein the chain extender is a cyclosilazane.

14. A method according to claim 12 wherein the chain extender is hexamethylcyclotrisilazane.

* * * * *